C. J. TROPPMAN.
GOGGLES OR EYE PROTECTOR.
APPLICATION FILED FEB. 24, 1914.

1,097,198. Patented May 19, 1914.

WITNESSES:
Wm. Harold Eichelman.
M. A. Milord

INVENTOR:
CHAS. J. TROPPMAN.
BY Benj. T. Rowehaung
ATTORNEY.

UNITED STATES PATENT OFFICE.

CHARLES J. TROPPMAN, OF CHICAGO, ILLINOIS, ASSIGNOR TO F. A. HARDY & COMPANY, OF CHICAGO, ILLINOIS, A CORPORATION OF ILLINOIS.

GOGGLES OR EYE-PROTECTOR.

1,097,198.   Specification of Letters Patent.   Patented May 19, 1914.

Application filed February 24, 1914. Serial No. 820,420.

*To all whom it may concern:*

Be it known that I, CHARLES J. TROPPMAN, a citizen of the United States, and a resident of Chicago, in the county of Cook and State of Illinois, have invented certain new and useful Goggles or Eye-Protectors, of which the following is a specification.

My present invention relates to the provision of a goggle or eye protector, the structure of which will combine sufficient rigidity to prevent relative displacement of the parts whereby distortion would be produced when glasses having correction are used, and, which, at the same time, will have such flexibility as to permit the goggles or eye protectors to readily and easily conform to the face of the wearer, and to be folded so as to occupy a minimum of space when not in use. It will be also noted that the temples, the ends of which may be covered, can be folded between the glasses so as to get them out of the way and also keep the lenses from coming in contact with each other, as such contact would greatly increase the liability to breakage.

I attain the above object by means of the structure illustrated in the accompanying drawing, in which—

Figure 1:
Figure 2:
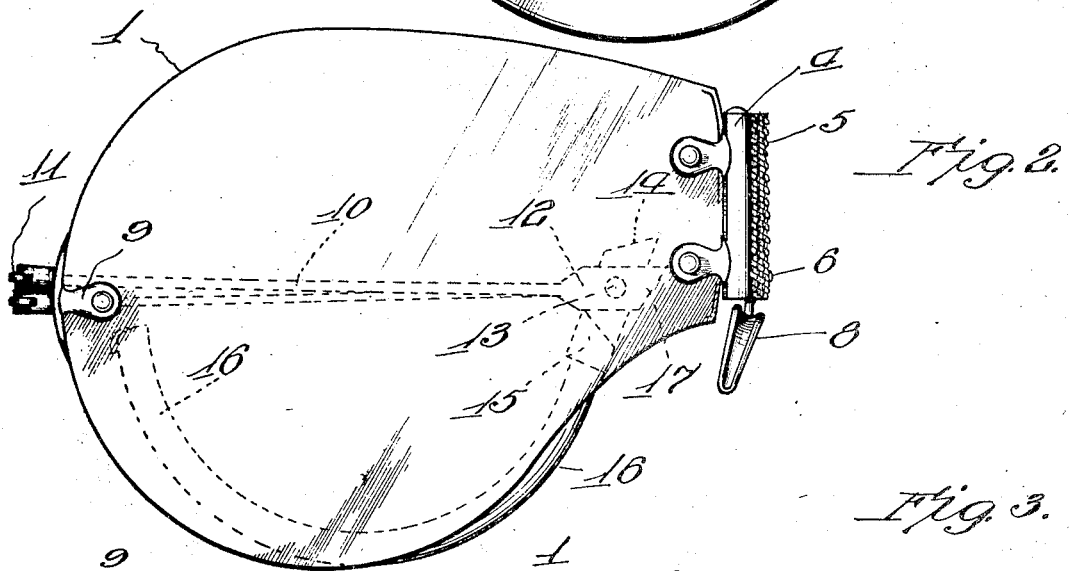
Figure 3:
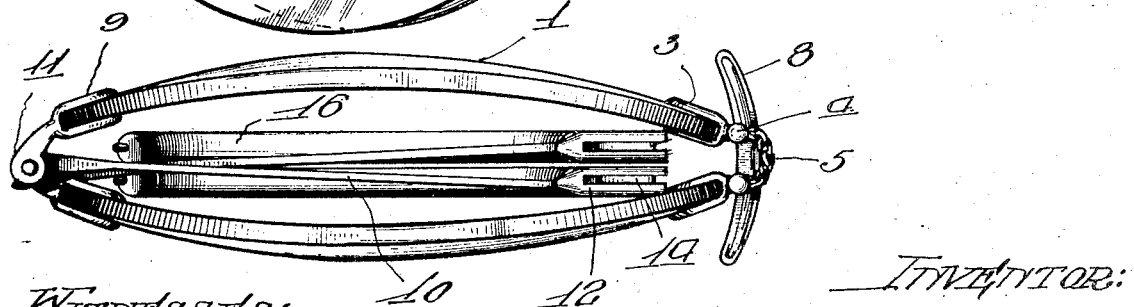

Figure 1 is a fragmental rear elevation of a pair of goggles or eye protectors showing one glass or lens entire and a portion of the other glass or lens with the means for connecting the glasses or lenses; Fig. 2 is an elevation of a pair of goggles or eye protectors folded, and Fig. 3 is a plan of the structure in the position shown in Fig. 2.

Similar reference characters refer to similar parts in the several views.

The goggles or eye protectors consist of the glasses or lenses 1, which may be ground if necessary to supply the requisite correction to the eyes. The lenses or glasses 1, are shaped in such a manner that their inner and upper portions extend above the nose of the wearer and terminate in substantially vertical edges 2. Just back of the vertical edges 2, the lenses or glasses are bored to receive the bolts or rivets 3, which coöperate with ears extending on both sides of the lenses, the ears extending from and being secured to a vertical bar 4. The vertical bars 4, to which the ears secured to the respective glasses or lenses extend, are secured to the edges of a piece of wire mesh 5, which constitutes the connecting member between the lenses for holding them in proper relation to one another, and also supplies the requisite flexibility for permitting the lenses to be accommodated to the face of the wearer, and for folding the glasses or lenses together when the goggles are not in use. To the lower edge of the mesh 5, by means of a rivet 6, or by solder, if that be desired, is secured a bracket 7, to the lower end of which is secured a bridge piece 8 to rest upon the bridge of the nose.

The goggles or eye protectors are held in position upon the face of the wearer by means of temples secured by the usual ears 9 to the outer edges of the respective glasses or lenses. These temples preferably consist of a metal rod 10 pivoted in the usual manner at 11, to the ears 9, the unattached end 12 of which is enlarged, horizontally bored at 13, and vertically slotted to receive, a plate 14 secured thereto by a bolt through the horizontal bore 13. The outer end of this plate is enlarged at 15 and carries a wire 16 for going over and around the ear. It is found desirable to cover the wire 16 with a woven silk or rubber tube which serves to protect the ear when in use and to prevent the lenses from coming into contact with each other when the goggle is in folded position as shown in Figs. 2 and 3. The end of the enlarged portion 12 is formed at 17 at an angle with the axis of the rod 10, and the enlarged portion 15 is formed at a similar angle so as to prevent the joint from folding upward but to leave it free to fold downwardly.

From the above description it will be seen that the construction will maintain the lenses at a uniform distance from each other when extended, and will prevent them from horizontal displacement, while, at the same time, it will secure a high degree of flexibility for the purposes of conforming to the face of the wearer and folding when not in use. It will also be seen that the arrangement of temples will prevent the glasses or lenses from coming together and thereby occasion a liability of breaking.

Having described my invention what I claim as new and desire to secure by Letters Patent, is:—

1. A goggle or eye protector consisting of glasses, the approximate edges of which are secured together by a wire mesh, a bridge secured medially to the said mesh, and means for securing the eye protector to the head secured to the outer edges of said lenses.

2. A goggle or eye protector consisting of glasses, the approximate edges of which are secured together by a metallic fabric, a bridge secured medially to the lower edge of said metallic fabric, and temples secured to the outer edges of said lenses.

3. A goggle or eye protector consisting of glasses, the approximate edges of which are secured together by a wire mesh, a bridge secured medially to the lower edge of said mesh, and temples secured to the outer edges of said lenses, said temples each consisting of two pieces, the end of one of which is vertically slotted and the end of the other of which is provided with a plate to enter said slot, said ends being pivoted in their assembled relation.

4. A goggle or eye protector consisting of glasses, the approximate edges of which are secured together by a wire mesh, a bridge secured medially to the lower edge of said mesh, and temples secured to the outer edges of said lenses, said temples being hinged medially of their ends so that their outer ends may be folded downwardly and outwardly to occupy a position between said glasses when the same are folded together.

In testimony whereof I hereunto affix my signature in the presence of two witnesses.

CHARLES J. TROPPMAN.

Witnesses:
EDWARD S. CRAVEN,
ELMER O. TROEGER.